(12) United States Patent
Buelna

(10) Patent No.: US 6,676,560 B1
(45) Date of Patent: Jan. 13, 2004

(54) CONTINUOUSLY VARIABLE TRANSMISSION

(76) Inventor: Terry Buelna, 15872 Standish La., Huntington Beach, CA (US) 92647

(*) Notice: Subject to any disclaimer, the term of this patent is extended or adjusted under 35 U.S.C. 154(b) by 42 days.

(21) Appl. No.: 10/076,534

(22) Filed: Feb. 15, 2002

Related U.S. Application Data

(60) Provisional application No. 60/342,929, filed on Oct. 22, 2001, and provisional application No. 60/268,980, filed on Feb. 15, 2001.

(51) Int. Cl.$^7$ .............................................. F16H 15/16
(52) U.S. Cl. .......................................... 476/51; 476/47
(58) Field of Search .............................. 476/29, 30, 31, 476/33, 47, 49, 50, 51

(56) References Cited

U.S. PATENT DOCUMENTS

| | | | |
|---|---|---|---|
| 625,859 A | | 5/1899 | Thornton et al. |
| 923,472 A | * | 6/1909 | Williamson .................. 476/50 |
| 1,232,243 A | * | 7/1917 | Dick ........................... 476/51 |
| 1,883,749 A | | 10/1932 | Standish |
| 2,292,066 A | | 8/1942 | Erban .......................... 74/200 |
| 2,573,258 A | | 10/1951 | Gerritsen ..................... 74/200 |
| 3,006,206 A | * | 10/1961 | Kelley et al. ................. 476/49 |
| 4,137,785 A | | 2/1979 | Virlon .......................... 74/194 |
| 5,014,565 A | | 5/1991 | Stephenson .................. 74/190 |
| 5,254,056 A | | 10/1993 | Nakano ........................ 476/10 |
| 6,053,841 A | | 4/2000 | Koide et al. .................. 476/40 |
| 6,106,431 A | | 8/2000 | Oshidari ....................... 476/40 |

FOREIGN PATENT DOCUMENTS

DE    2 313 097    *    3/1973

OTHER PUBLICATIONS

K. Clemens, "Technology of the Year 1996—Honda's Continuously Variable Transmission", *Automobile Magazine*, Jan. 1996.

T. Swan, "Smooth–Shifting Honda Civic Coupe Stays One of the Best Small Cars", Aug. 22, 1996, http://www.auto-.com/reviews/86421.htm.

M. Kluger, "Gearing up for CVTs", *Technology Today*, Summer 2000, published by Southwest Research Institute.

"Distribution of the Toroidal CVT", JATCO TransTechnology Ltd., http://www.jatco.co.jp/E_JATCO/NEWS02.HTM.

* cited by examiner

*Primary Examiner*—William C. Joyce
(74) *Attorney, Agent, or Firm*—Stetina Brunda Garred & Brucker

(57) ABSTRACT

A continuously variable transmission has a main shaft rotating about a longitudinal axis. An input disk and output disk are fixed to the main shaft. An idler disk that rotates about and translates along the main shaft is mounted between the input and output disks. A plurality of conical input rollers engage mating surfaces on the input disk and the idler disk. A plurality of output rollers engage mating surfaces on the output disk and the idler disk. The input and output rollers move in planes orthogonal to the longitudinal axis to vary the drive ratio of the transmission. Input gears are connected to rotate coaxially with the input rollers, and output gears are connected to rotate coaxially with the output rollers. The rollers translate relative to the gears. Ring gears engage the input and output gears to input and output power. Alternatively, power can be input or output through one of the rollers.

17 Claims, 13 Drawing Sheets

CONTINUOUSLY VARIABLE TRANSMISSION

CROSS-REFERENCE TO RELATED APPLICATIONS

This application claims the benefit under 35 U.S.C. §119 (e) of Application No. 60/268,980, filed Feb. 15, 2001, and Application No. 60/342,929, filed Oct. 22, 2001.

FIELD OF THE INVENTION

This invention relates to continuously variable transmissions.

BACKGROUND OF THE INVENTION

Gear reductions are used to more efficiently transmit power from a power source, such as an internal combustion engine or a waterwheel, to a driven object, such as a set of automobile tires or a piece of machinery. Using fixed sized gears presents problems with shifting between gears and provides a very few gear ratios. For example, currently car transmissions have from three to six gears.

Continuously Variable Transmissions (CVT's) can provide a greater number of potential gear ratios, and in theory can continuously vary the gear ratios within the operating range of the particular CVT design that is used. But CVT's require specially curved surfaces, such as spherical surfaces or torroidal surfaces. Those specially curved surfaces are not only expensive to make, but result in concentrated forces that often lead to premature wear. Further, CVT designs use asymmetrically arranged parts that result in uneven loads on the parts of the transmissions which in turn cause premature wear. There is thus a need for an improved CVT using commonly available gear shapes and symmetric loading of parts in the transmission.

SUMMARY OF THE INVENTION

A continuously variable transmission (CVT) is provided that produces a variable drive ratio between an input and an output. The CVT has a main shaft rotating about a longitudinal axis. An input disk and an output disk are fixed to the shaft. Each disk has a driving surface inclined at substantially the same angle with respect to a plane orthogonal to the rotational axis. Each driving surface faces the driving surface on the other disk. An idler disk has a central hole through which the shaft extends, with the idler disk being interposed between the two end disks. Thus, the idler disk is mounted so as to rotate relative to the shaft, and the hole and shaft are configured to allow this rotation and to allow the disk to translate along a portion of an axial length of the shaft. The idler disk has two opposed driving surfaces inclined toward each other at substantially the same inclination angle as the driving surfaces on the end disks. The existence and movement of the idler are believed unusual in CVT's.

A plurality of input rollers are provided. Each input roller has a conical driving surface, and each roller rotates about an input roller axis that extends radially outward from the rotational axis of the shaft in a first plane orthogonal to the rotational axis of the shaft. The conical driving surfaces drivingly engaging driving surfaces on the input disk and on the idler disk. The disks and rollers are arranged so that moving the rollers along the input roller axes varies the drive ratio.

A plurality of output rollers are also provided. Each output roller has a conical driving surface, and each output roller rotates about an output roller axis that extends radially outward from the rotational axis of the shaft in a second plane orthogonal to the rotational axis of the shaft. The conical driving surfaces drivingly engage driving surfaces on the output disk and on the idler disk. The disks and output rollers are arranged so that moving the output rollers along the output roller axes varies the drive ratio.

The input rollers and output rollers are symmetrically arranged about the main shaft rotational axis to provide a balanced load on the CVT preferably, there are three input rollers and three output rollers, but the number can vary according to the needs of the CVT. Each output roller is preferably mounted to an output shaft extending along the output roller axis. An output gear is mounted on the output roller shaft to rotate with the output roller. An output shaft is placed coaxially with the main shaft and is connected to an output ring gear engaging the output gears as one way to transfer power from the output gears of the CVT to an output shaft. The coaxial output shaft offers advantages in many applications.

The input roller is preferably mounted to an input shaft extending along the input roller axis, with an input gear mounted thereon to rotate with the input roller. An input shaft is placed coaxially with the main shaft and is connected to an input ring gear to engage the input gears as one way to transfer power from a power source to the CVT. The coaxial input shaft offers advantages in many applications.

A hydraulic piston can be connected to each output shaft to move the output shaft along the output roller axis. Likewise, a hydraulic piston can be connected to each input shaft to move the input shaft along the input roller axis. Movement of the input and output rollers toward and away from the main shaft alters the drive ratio. Hydraulic actuation helps ensure the rollers move at the same time and at the same rate of movement.

A useful angle of inclination is between about 7–30 degrees, with 10–14 degrees being a preferred range, and an angle of about 12 degrees being believed most useful for most applications. Angles of about 30 degrees or less are believed usable but the success will vary with the application.

Advantageously, but optionally, the main shaft has distal ends that are held in recesses adapted to allow the main shaft to rotate about and translate along the rotational axis of the main shaft. That axial movement, along with the axial movement of the idler disk, further accommodates radial movement of the input and output rollers as the drive ratio is varied.

In a further embodiment, the CVT includes a main shaft rotating about a longitudinal axis of the main shaft and having an input disk and an output disk fixedly mounted thereon to rotate and translate with the main shaft. An idler disk is interposed between the input and output disks. The idler disk can rotate about the main shaft and translate along the longitudinal axis of a portion of the main shaft. The input and output disks each have an annular driving surface inclined at an angle with respect to the vertical that is less than about 30 degrees. The idler disk has two annular and opposing surfaces each forming an inclined driving surface and each facing a driving surface on one of the input and output disks.

The main shaft has opposing, first and second distal ends, with a first recess receiving the first distal end of the main shaft and allowing the first distal end to freely rotate and to translate within the first recess. A second recess receives the second distal end of the main shaft and allows the second distal end to freely rotate and to translate within the second recess. The translation of the shaft further accommodates radial movement of input and output rollers described hereinafter.

A plurality of conical input rollers are provided and have rotational axes that are symmetrically arranged around the main shaft in a first plane orthogonal to that shaft and engaging the driving surface of the input disk and one driving surface of the idler disk. A plurality of conical output rollers are also provided and have rotational axes that are symmetrically arranged around the main shaft in a second plane orthogonal to that shaft and engaging the driving surface of the output disk and one driving surface of the idler disk. Movement of the rollers along the axis of rotation of the rollers varies the drive ratio. Hydraulic means can be provided for moving the rollers along the axes about which the rollers rotate. That arrangement allows the rollers to move radially toward and away from the rotating main shaft to vary the drive ratio, while gears rotating with the rollers remain in place and rotate to transmit power through the CVT.

Alternatively, mechanical means can be provided for moving the rollers along the axes about which the rollers rotate. The mechanical means preferably involve screw threads cooperating with shafts to which the rollers are mounted.

In a still further embodiment, the CVT includes a main shaft having a longitudinal rotational axis and having three disks mounted on the main shaft. The disks include a fixed input disk with a conical, input engaging surface; a fixed output disk with a conical, output engaging surface; and an idler disk having a conical engaging surface on each of two opposing sides. Each engaging surface of the idler disk faces one of the other engaging surfaces, with the idler disk rotating about and translating along a portion of the main shaft.

Input rollers, having input rotational axes located in a first plane orthogonal to the longitudinal axis, drivingly engage the rotational surfaces on the input disk and the idler disk. The input rollers have conical surfaces and are located to achieve that engagement. Output rollers, having output rotational axes located in a second plane orthogonal to the longitudinal axis, drivingly engage the rotational surfaces on the output disk and the idler disk. The output rollers have conical surfaces and are located to achieve that engagement.

Each input roller is connected to an input roller shaft that rotates with the input roller and to which is fastened an input gear that also rotates with the input roller shaft. The input gear slides along a length of the input roller shaft. Likewise, the output roller is connected to an output roller shaft that rotates with the output roller and to which is fastened an output gear that also rotates with the output roller shaft. The output gear slides along a length of the output roller shaft. That arrangement allows the rollers to move radially toward and away from the rotating main shaft to vary the drive ratio, while the gears remain in place and rotate to transmit power through the CVT.

The power output from the CVT can be taken from any of the shafts that rotate with the output rollers. A splined or geared surface rotating with the output rollers readily provides a mechanism for transmitting power from the output rollers.

The CVT uses flat, conical surfaces which are more easily produced than the complex shapes of engaging surfaces used in prior CVT's. The CVT uses a floating idler disk to balance the loads on the CVT, allowing the use of smaller bearings and lighter parts. The CVT can use a floating main shaft to further allow for alignment and engagement of the rotating disks and rollers. Because radial movement of the rollers varies the drive ratio, a large variety of drive ratios can be achieved merely by scaling the disks and rollers to the appropriate size. Alternatively, a plurality of CVT's could be cascaded in order to achieve a variety of drive ratios.

BRIEF DESCRIPTION OF THE DRAWINGS

These, as well as other features of the present invention, will become more apparent upon reference to the drawings in which like numbers refer to like parts throughout, and in which.

DETAILED DESCRIPTION

Figure 1:
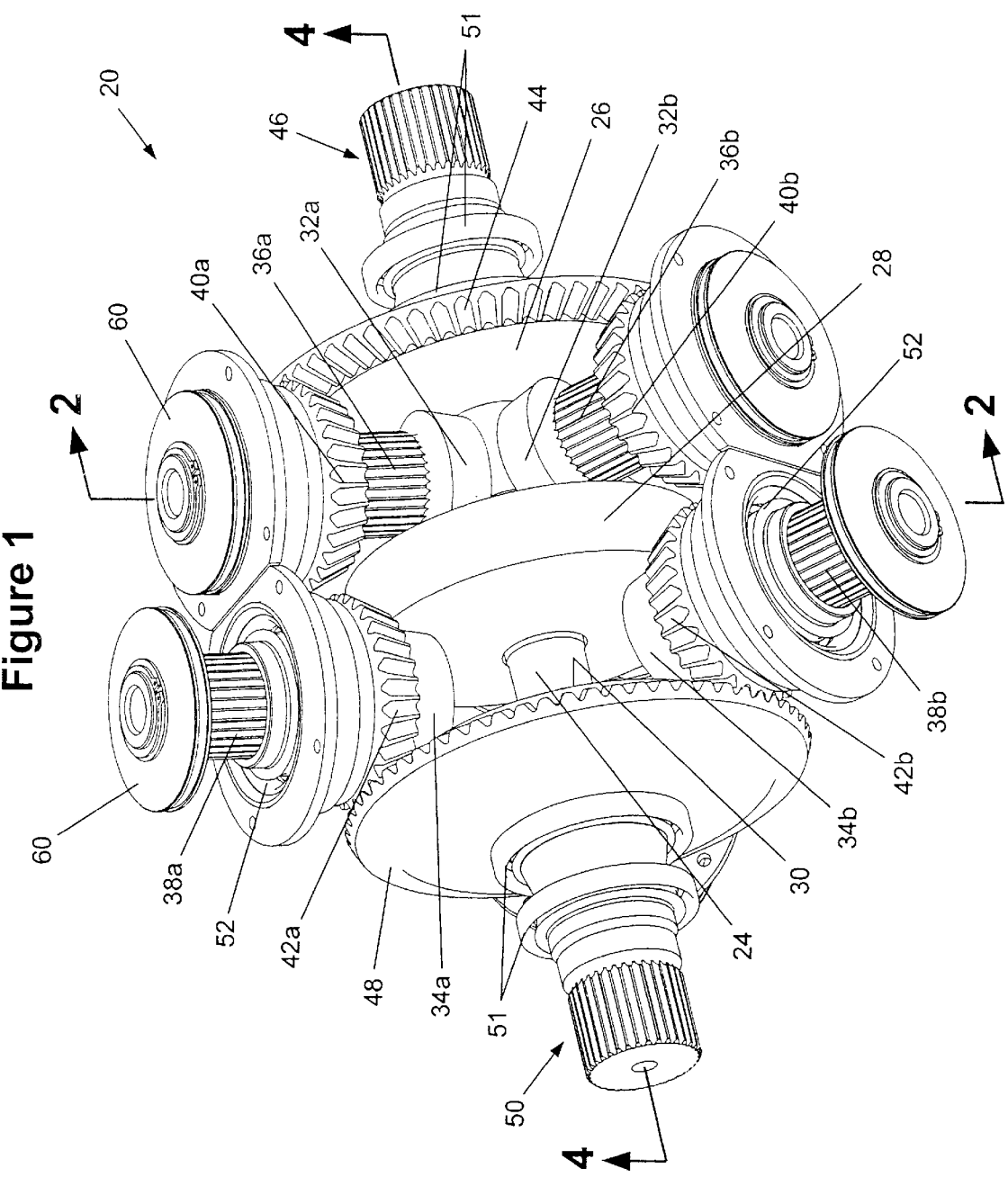
FIG. 1 is a perspective view of a CVT in a high drive ratio configuration.

Referring to FIGS. 1–6, continuously variable transmission (CVT) 20 is shown. The CVT 20 has a housing 22 enclosing and/or supporting various parts. A central, rotating shaft 24 has three disks 26, 28, 30 mounted on that main shaft 24. The disks 26, 30 have one conical driving surface, and disk 28 has two conical driving surfaces. Two of the disks 26, 30 are on opposing ends of the main shaft 24 and are fixed to the main shaft 24 so they rotate with the shaft and cannot translate along the length of the shaft. Preferably, the end disk 26 is formed integrally with the main shaft 24 or is permanently mounted to that shaft. The other end disk 30 is fixedly mounted to the shaft by various known mechanisms. The middle disk 28 is mounted on the main shaft 24 so that the disk 28 can float along the length of the main shaft 24 and rotate relative to the shaft. During use, the middle disk 28 rotates in a direction opposite the end disks 26, 30.

The disks 26, 28, 30 have inclined conical surfaces with a common angle of inclination that is selected to coincide with an inclination angle of a plurality of conical rollers 32a, 32b, 32c, and 34a, 34b, 34c, that are interposed between each adjacent pair of the disks 26, 28, 30 and that drivingly engage those disks. Because the mounting and operation of rollers 32, 34 are the same, a description of and reference to roller 32 can apply equally to any of rollers 32a, 32b, 32c. The same is true with roller 34, and with a number of parts described hereinafter. The inclined surfaces on disks 26, 28, 30 are made of a material and finish suitable for transmitting high forces, especially when an appropriate transmission fluid is used with the contacting surfaces. A suitable material is case hardened steel with traction fluid.

Three input rollers 32a, 32b, 32c are interposed between the end disk 26 and middle disk 28, and three output rollers 34a, 34b, 34c are interposed between the middle disk 28 and the end disk 30. There are thus a total of six rollers, in two groups of three, with each group of three being spaced about 120° from the adjacent roller. The sectional view has these various rollers aligned on opposite sides of the shaft to make it easier to see how the transmission works. This is done because planar sheets of paper make it difficult to show the three parts on the plane of the paper, so the sections are taken along angled axes in order to more clearly show the construction of the CVT 20. Thus, while the drawings appear to show two parts, such as two rollers 32 or two rollers 34, there are actually three such rollers. As described later, various numbers of rollers and other parts can be used.

The disk 32 is located on the end of input roller shaft 36, and the disk 34 is located on the distal end of output roller shaft 38. The disks 32, 34 and their respective roller shafts 36, 38 rotate about axes extending radially from the rotational axis of main shaft 24, with the rotational axes of each of the disks 32a, 32b, 32c being in a first plane, and with each of the rotational axes of disks 34a, 34b, 34c being in a second plane that is parallel to the first plane and orthogonal to the rotational axis of main shaft 24. The inclined surfaces on rollers 32, 34 and disks 26, 28, 30 are made of a material and finish suitable for transmitting high forces, especially when an appropriate transmission fluid is used with the contacting surfaces.

An input bevel gear 40 is mounted coaxially with each of the input roller shafts 36, and an output bevel gear 42 is mounted coaxially with each of the output roller shafts 38. A splined exterior surface on roller shafts 36, 38 and mating surfaces on the interior of bevel gears 40, 42 allow the shafts to move along the length of the shafts relative to the bevel gears, with the bevel gears 40, 42 remaining in a fixed location. While the rollers 32, 34 move along the longitudinal axis of their respective roller shafts 36, 38, the splined engagement causes the rollers to rotate with the bevel gears 40, 42 about the longitudinal axis of the respective roller shafts 36, 38. Thus, the gears 40, 42 rotate with the rollers 32, 34.

A larger diameter, beveled ring input gear 44 simultaneously meshes with each of the three input bevel gears 40, with the ring input gear 44 being drivingly connected to input shaft 46. Similarly, beveled ring output gear 48 simultaneously meshes with each of the output gears 34, and output ring gear 48 is connected to output shaft 50. Suitable bearings 51 and 52 are used to mount the various rotating shafts to housing 22 which is sized and configured to support the various components and to enclose the various components as needed. Bearings 51 are primarily designated for use with the input and output shafts 36, 38, and bearings 52 are primarily designated for use with main shaft 24.

The six rollers 32, 34 are actuated by various means to move toward and away from the main shaft 24. The actuation can be by electrical motors but is preferably hydraulically actuated, so the rollers 32, 34 simultaneously move toward and away from the rotational axis of main shaft 24 at the same rate. As the three input rollers 32a, 32b, 32c are hydraulically forced toward the axis and main shaft 24, the middle disk 28 is forced to the left in FIG. 1, and the output rollers 34a, 34b, 34c are forced away from the rotational axis and main shaft 24. That varies the gear ratio in one manner. Conversely, the output rollers 34a, 34b, 34c can be forced toward the main shaft 24 and move the middle disk 28 to the right (as shown in FIG. 1) while the input rollers 32a, 32b, 32c move away from the main shaft 24 in order to vary the gear ratio in the opposite manner. The force on the output rollers 34 can be varied to move them simultaneously with the input rollers 32.

Thus, hydraulic force and the inclined surfaces of the disks 26, 28, 30 and rollers 32, 34 determines a continuously variable gear ratio, while rotation of the input and output rollers 32, 34 is transmitted to the roller gears 40, 42 in order to provide an input and output through shafts 46, 50, respectively.

With that overview, a more detailed description of the construction will be given. In operation, power is fed through the input gear shaft 46 which has a distal end adapted to connect to a power source, such as an internal combustion engine, a turbine engine, an electrical motor, or other power source that can provide rotary motion to the input shaft 46. A splined end on the shaft 46 can be used for the connection, but other connections suitable to the particular application or power source can also be used. The input shaft 46 is supported in the housing 22 by anti-friction bearings 51, which are preferably oppositely inclined in order to provide axial restraint to the input shaft 46 while still allowing ready rotation of input shaft 46. The input shaft 46 is preferably integrally cast with, or welded to, or bolted to, input ring gear 44 so that power from the input shaft 46 is transmitted to the ring gear 44. Ring gear 44 meshes with the three input rollers 32 through input bevel gears 40.

Located coaxially within each input roller bevel gear 40 is one of the input rollers 32 (32a, 32b, 32c). The traction end of the input roller 32 is conically shaped to frictionally engage the inclined surfaces of disks 26, 28 on opposing sides of the roller 32. The end of the input roller shaft 36, to which the input roller 32 is connected, is attached to a piston 60.

The piston 60 works within a hydraulic cylinder 62 such that a change in hydraulic pressure in the cylinder 62 causes the piston 60 to move along the rotational axis of input roller shaft 36. An inlet 64 in fluid communication with the inside of cylinder 62 is connected to a hydraulic motor 66 (FIG. 8) which provides the hydraulic pressure to vary the position of the piston 60 and attached input roller 32. Actually, the piston 60 can move the input roller 32 toward the shaft 24, but the input roller 32 is moved away from the shaft 24 primarily by movement of the output roller 34 toward the shaft, through back driving via the inclined surfaces of the rollers 32, 34 and disks 26, 28, 30.

The traction surface on conical roller 32 (32a, 32b, 32c) drives against the input disk 26 on one side, and drives against idler or middle disk 28 on the opposite side of each roller 32. There are three rollers 32a, 32b, 32c (FIG. 2), and that provides a symmetric distribution of forces on the disk 26, and on idler disk 28. The idler disk 28 rotates about main shaft 24 on busing 68 and can translate parallel to the main shaft 24 for limited distances depending on the relative positions of rollers 32, 34.

The main shaft 24 can also freely rotate about its longitudinal axis, which coincides with the longitudinal axis of input shaft 46 and output shaft 50. Main shaft 24 preferably has opposing distal ends 70, 72 which mount into recesses 74, 76 in the input shaft 46 and output shaft 50, respectively. Bushings, roller bearings or other anti-friction supports can be used to reduce the frictional rotation of the main shaft 24 relative to the input shaft 46 and output shaft 50. The anti-friction supports, such as bushings 68, also allow the axis 24 to translate along the rotational axis.

Applying hydraulic pressure to the input cylinders 62 (62a, 62b, 62c) and pistons 10 (10a, 10b, 10c) forces the three input rollers 32 (32a, 32b, 32c) against the mating surfaces of disks 26, 28. As the input rollers 32 rotate, they spin the input disk 26 in one direction and spin the middle or idler disk 28 in the opposite direction due to the traction effect at the contact point between the mating parts of the rollers 32 and disks 26, 28.

The input rollers 32 are radially displaced about the main shaft 24 such that the hydraulic actuation forces are all in balance and no net bending forces are produced in the main shaft 24, input roller shaft 36, disk 26 or disk 28. This balanced force distribution requires a minimum of two input rollers 32, and preferably three rollers 32 are used. More than three sets of input rollers 32 and bevel gears 40 could be used, as desired. Increased numbers of rollers 32 and gears 40 allow increased torque transmission, and the numbers can be varied as the application requires. As the number of rollers 32 and gears 40 increase, the radial size will generally increase, and that may pose physical size limitations but will depend on the application.

The input shaft 46, ring gear 44, input bevel gears 40, rollers 32, accompanying input roller shafts 36, and engaging portions of disks 26, 28 along with the mating portions of main shaft 24 form an input portion of the CVT 20. The output portion of the CVT is a mirror image of the input portion and operates in reverse.

The output portion has the output disk 30 rotatably fixed to the main shaft 24 by a spline 78. Threaded fasteners 79, such as a collar or locknut, hold the disk 30 in a fixed location along the length of the main shaft 24. The end disk 30 is thus, preferably mounted to the shaft with the splined connection and locking threaded fasteners 79 around the main shaft 24, but other fastening mechanisms could be used, such as pins, keys, welding, etc. The end or output disk 30 is preferably adjusted during assembly relative to input disk 26, and then the output disk is fastened into position. Since the output disk 30 and input disk 26 are each fixed to the main shaft 24, the disks 26, 30 rotate with the main shaft 24 in the same direction and at the same speed. The output rollers 48 ride in the space between the output disk 30 and the middle or idler disk 28, with the conical portion of the output rollers 34 frictionally engaging the disks 28, 30.

Pistons 60 fastened to the output roller shafts 38 of the output rollers 34 cause the rollers 34 to move toward the shaft 24 with the inclined surfaces on the disks 26, 28, 30, and on the rollers 32, 34 causing the shafts 38 to move away from the shaft 24 in response to inward motion of input rollers 32 caused by the input piston 60. In particular, piston 60 works within an output hydraulic cylinder 80 such that a change in hydraulic pressure in the output cylinder 80 causes the piston 60 to move along the rotational axis of shaft 24. An inlet 82, in fluid communication with the inside of cylinder 80, is connected to a hydraulic motor, which is preferably but optionally common with motor 66 (FIG. 9), to provide the hydraulic pressure to vary the position of the piston 60 (60a, 60b, 60c) and attached output roller 34 (34a, 34b, 34c).

The traction surface on conical rollers 34 (34a, 34b, 34c) drives against the output disk 30 on one side and drives against idler or middle disk 28 on the opposite side of each roller 34. There are three rollers 34a, 34b, 34c (FIG. 1) and that provides a symmetric distribution of forces on the output disk 30, and on the idler disk 28. The idler disk 28 rotates about main shaft 24 on bushing 68 and can translate parallel to the main shaft 24 for limited distances depending on the relative positions of rollers 32, 34. As the rollers 34 are forced to bear tightly against the counter rotating disks 28, 30, a traction effect at the contact points between the disks and rollers cause the output roller 34 to rotate and transmit power to the ring gear 48 and output shaft 50. A suitable connection can be used to couple the output shaft 50 to any of a variety of driven devices. A splined surface or U-joints or any of a variety of other coupling devices can be used.

The output roller 34 is coaxial with the output roller shaft 38 and bevel gear 42. The output rollers 34 and input rollers 32 are each fixed radially by splines 84 so the rollers cannot rotate relative to their respective gears 40, 42, but so the rollers 32, 34 can move axially along with the roller shafts 36, 38 to which they are mounted while the gears 40, 42 remain drivingly engaged with the input or output ring gears 44, 48.

Suitable bearings 52 are used to mount the bevel gears 40, 42. Preferably, the bearings 52 are inclined relative to the roller shafts 36, 38 so the bearings provide some axial support while allowing free rotation of the rollers 32, 34; roller shafts 36, 38; and gears 40, 42.

Figure 2:
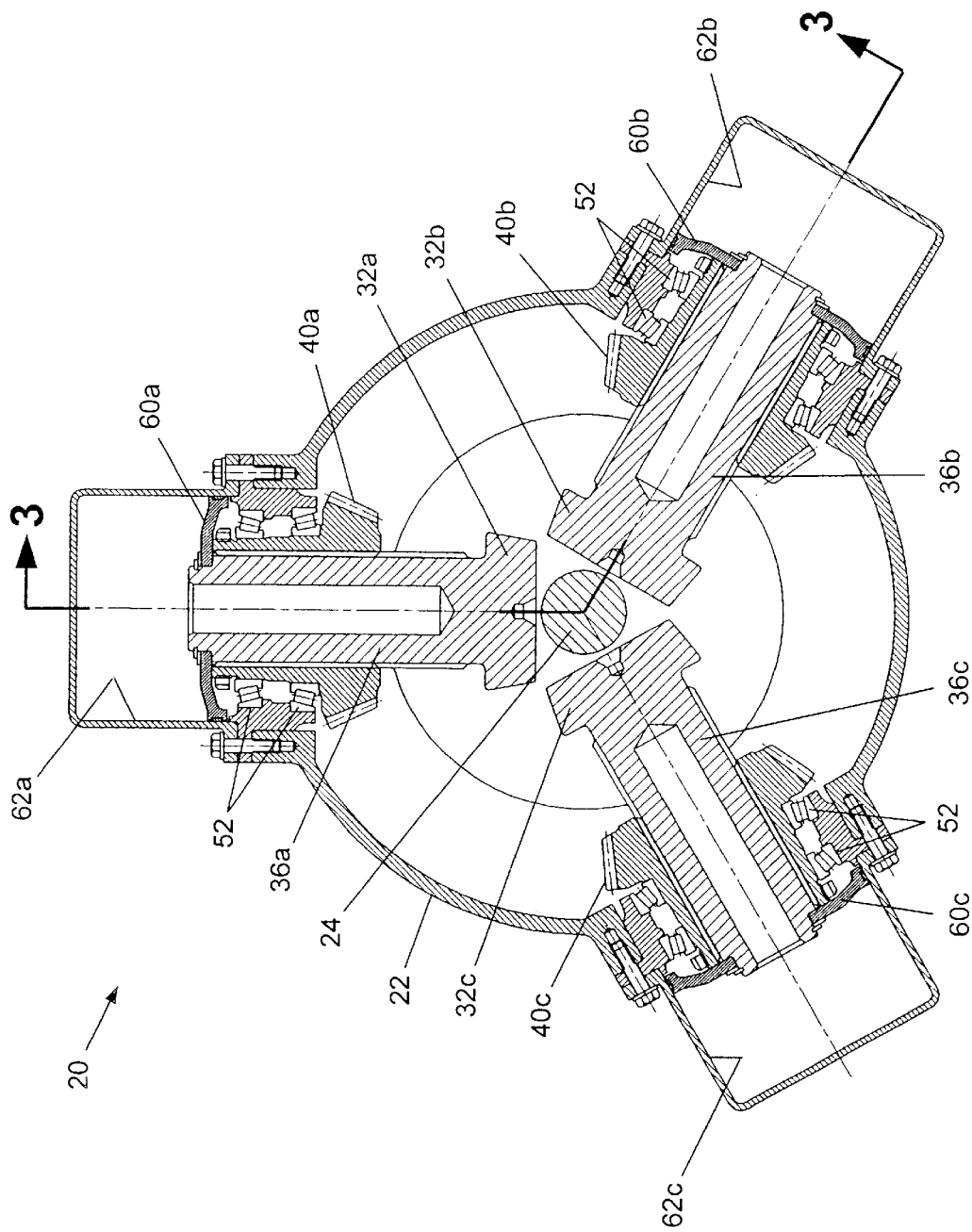
FIG. 2 is a sectional view taken along 2—2 of FIG. 1 and FIG. 3.
Figure 3:
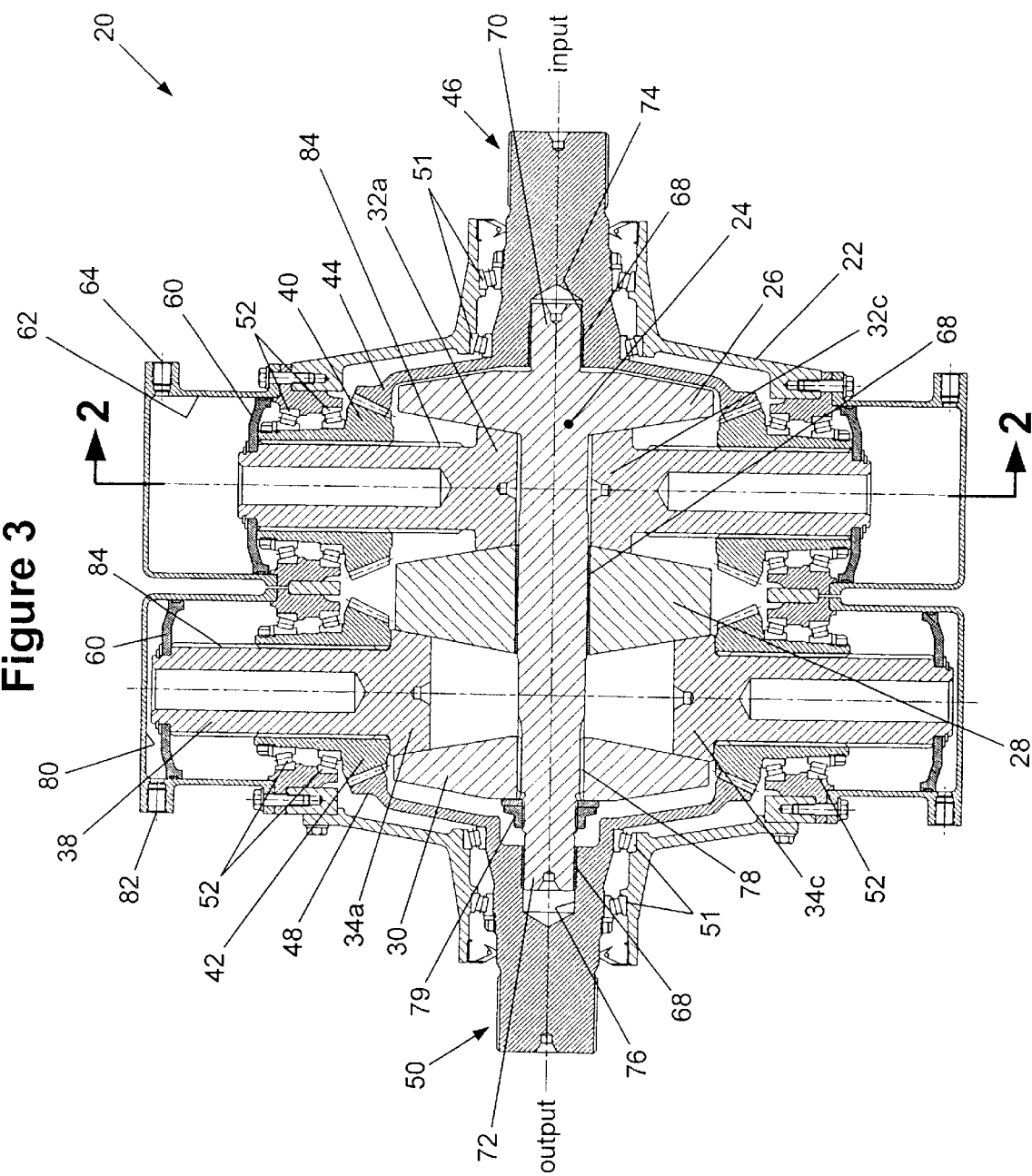
FIG. 3 is a sectional view taken along 3—3 of FIG. 2.

The CVT 20 allows a continuously variable gear ratio, depending on the position of the input rollers 32 and the output rollers 34. Referring to FIGS. 1–3, a high drive ratio is shown. The input rollers 32 are adjacent to the main shaft 24, and the output rollers 34 are adjacent to the outer periphery of the inclined engaging surfaces of idler disk 28 and output disk 30. One rotation of input rollers 32 produces greater than one rotation of output rollers 34, thus resulting in a gear increase. Hence, output shaft 50 that is driven by output roller 34 and gears 42, 48, rotates faster than input shaft 46 which drives input rollers 32 through gears 44, 40. This provides a high drive ratio. The drive ratio is limited only by the relative size and strength of the described parts. A drive ratio of 6:1 or 7:1 or greater, input:output, is believed readily achievable and desirable for use on motor vehicles.

Figure 4:
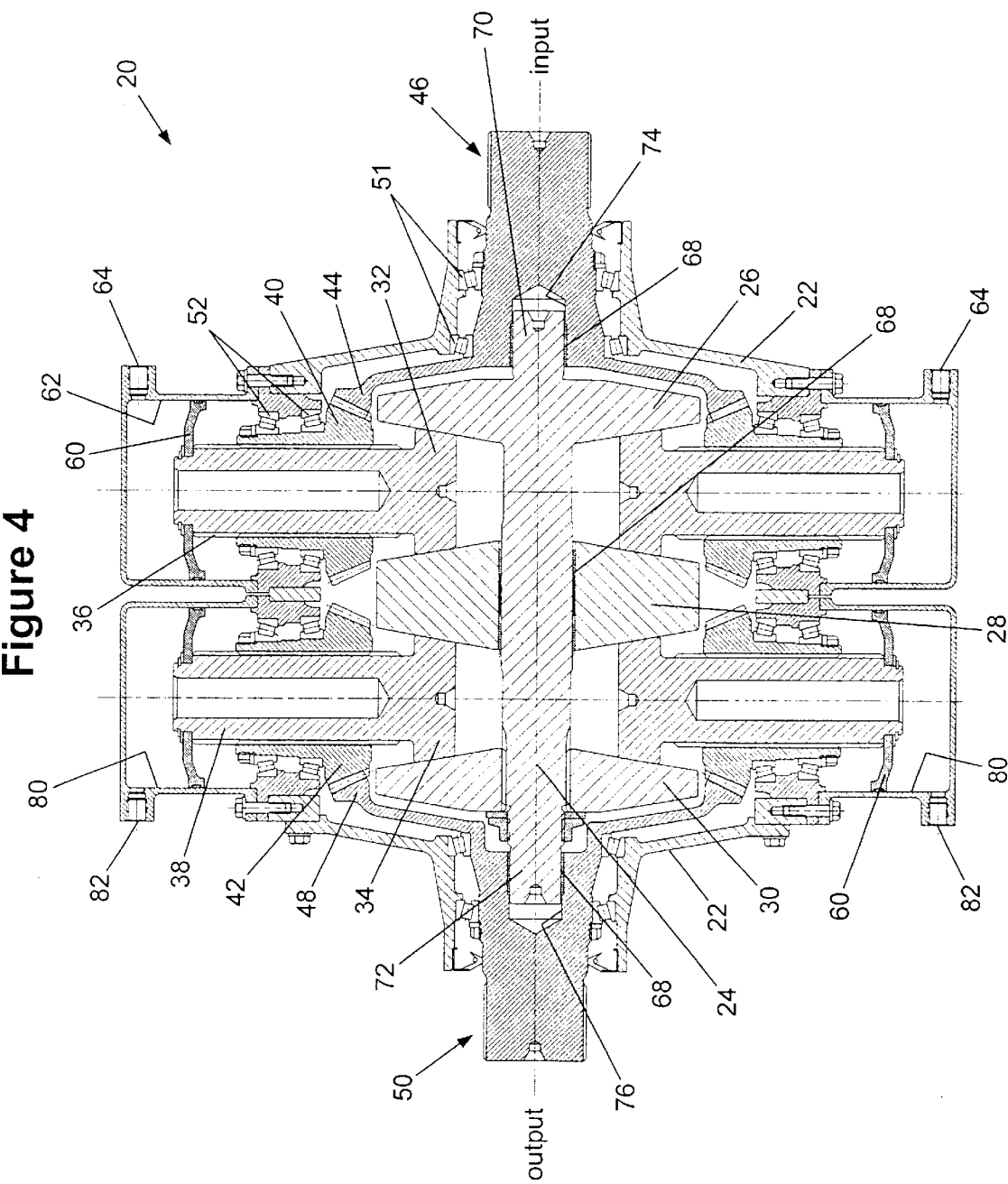
FIG. 4 is a sectional view taken along 4—4 of FIG. 1, showing the rollers in a middle drive ratio position.

Referring to FIG. 4, an intermediate drive ratio is shown. In this configuration the input shaft 46 rotates the same as the output shaft 50, and the input roller 32 rotates at the same rate as the output roller 34. Here, the input rollers 32 and output rollers 34 are at the same radial distance from the main shaft 24, and the angle of inclination on the rollers 32, 34; and hence of the mating surfaces on disks 26, 28, 30; are the same. Further, the diameter of rollers 32, 34 are the same, and the gears 40, 42 are the same. In practice, these parts could be altered to be of different sizes. That would alter the gear ratios, but that would also result in non-symmetric loading of the parts which in turn would create difficulties with balancing, stresses and wear. For those reasons, the corresponding parts are preferably, but optionally, maintained the same.

Figure 5:
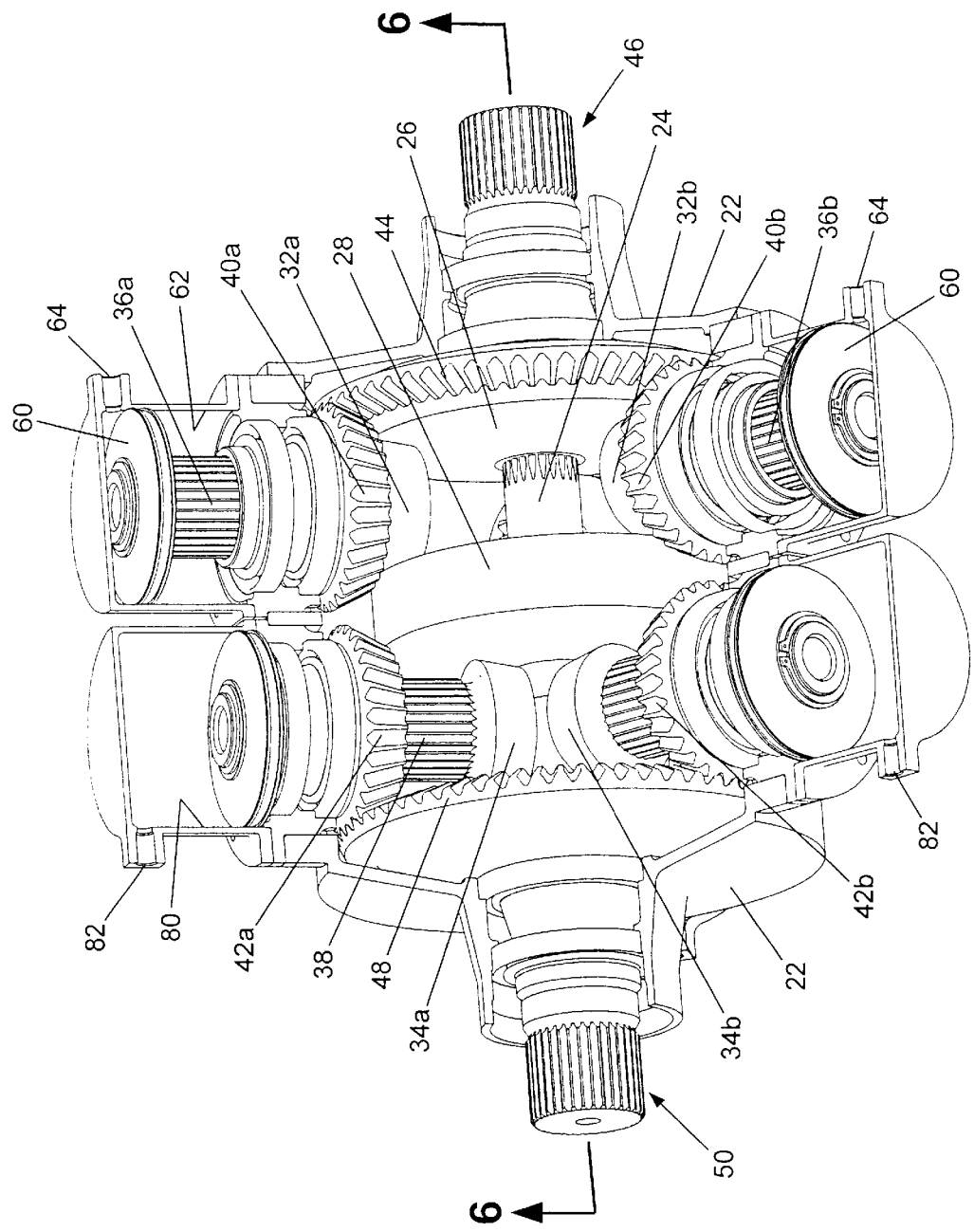
FIG. 5 is a perspective view of the CVT of FIG. 1 in a low drive ratio position.
Figure 6:
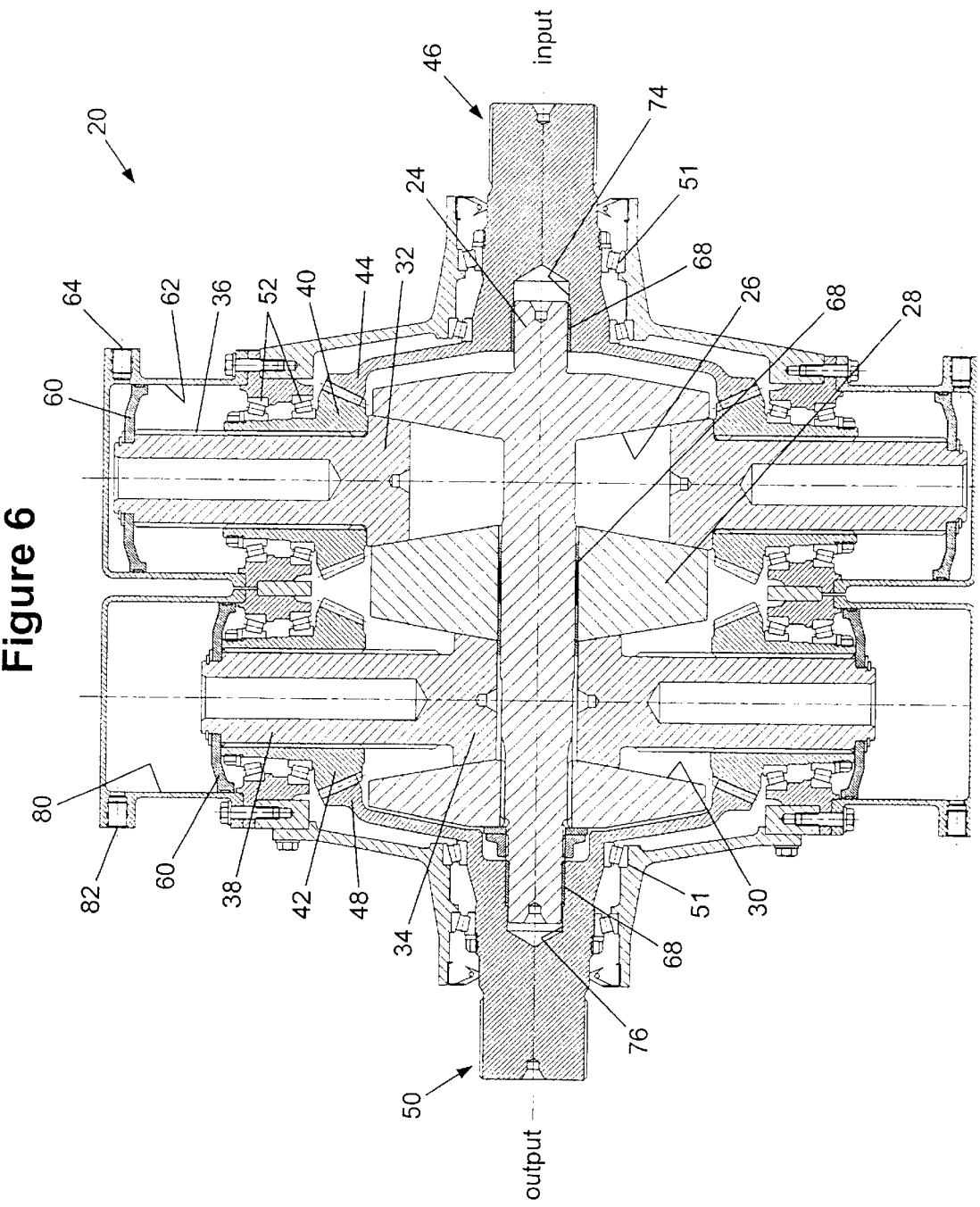
FIG. 6 is a sectional view taken along 6—6 of FIG. 5a, showing the rollers in a low drive ratio position.

Referring to FIGS. 5–6, a low drive ratio is shown. Here, the input rollers 32 are the furthest distance from the rotating main shaft 24 and output rollers 34 are adjacent to the rotating main shaft 24. Further, the angle of inclination on the rollers 32, 34; and hence of the mating surfaces on disks 26, 28, 30; are the same, and the rollers 32 are the same size as rollers 34, and gears 40 are the same as gears 42. In this configuration the input shaft 46 rotates faster than the output shaft 50, and the input roller 32 rotates faster than the output roller 34. This provides a low drive ratio or a large decrease in speed from the input shaft to the output shaft.

Figure 7:
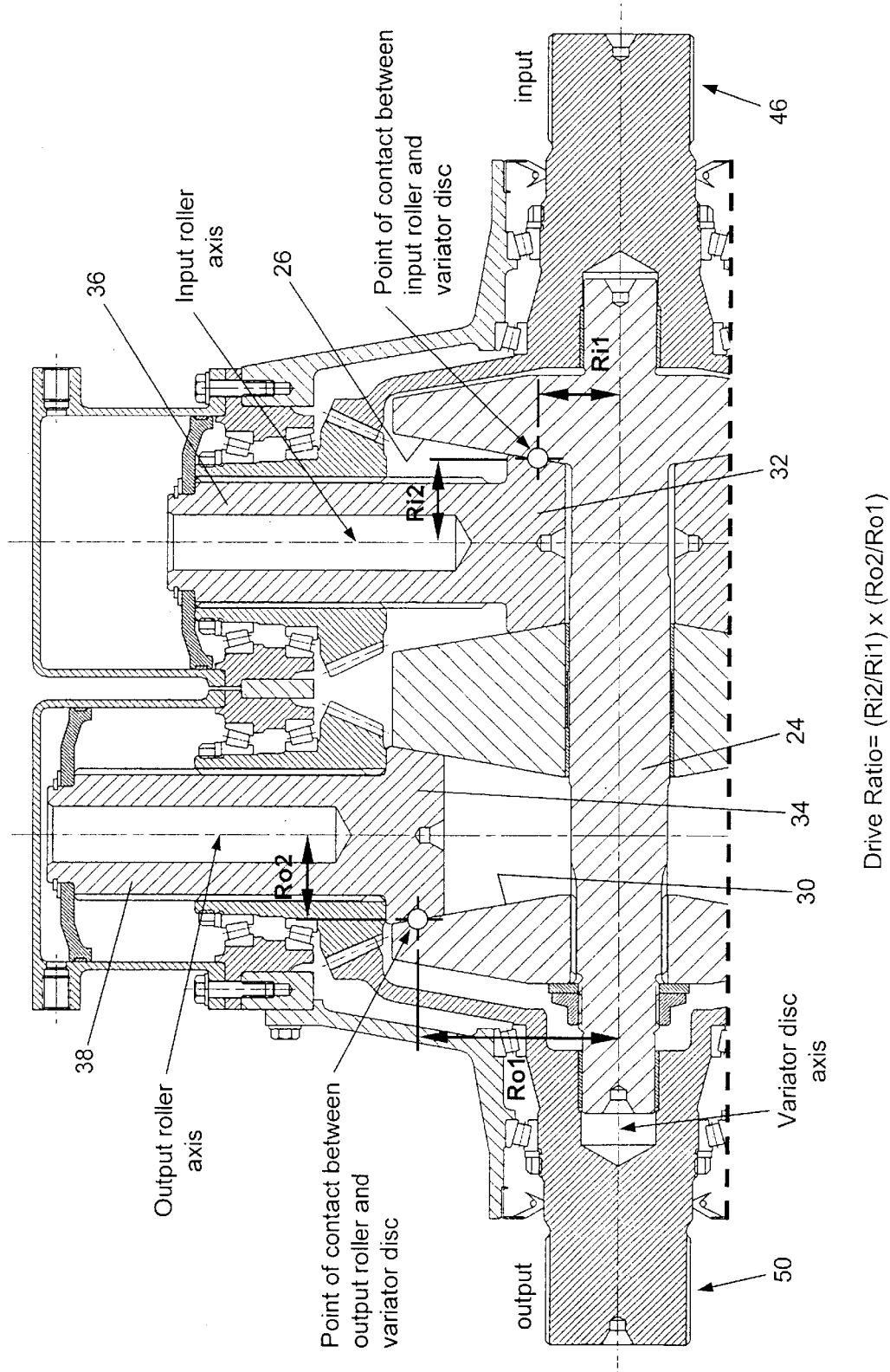
FIG. 7 is a cross sectional view taken along 3—3 of FIG. 2, showing the drive-ratio calculations.

Referring to FIG. 7, the drive ratio can be calculated. The drive ratio is calculated as follows assuming zero slip between rotating parts:

$$\text{Drive Ratio} = (Ri_2/Ri_1) \times (Ro_2/Ro_1)$$

$Ri_1$=radial distance from the axis of rotation of main shaft 24 to the point of contact between the input roller 32 and the input disk 26

$Ri_2$=axial distance from the axis of rotation of input roller 32 to the point of contact between the input roller 32 and the input disk 26

$Ro_1$=radial distance from the axis of rotation of main shaft 24 to the point of contact between the output roller 34 and the output disk 30

$Ro_2$=axial distance from the axis of rotation of output roller 34 to the point of contact between the output roller 34 and the output disk 30

The disks 26, 28, 30 have conical surfaces that engage the rollers 32, 34. As the diameter of those disks 26, 28, 30 increases, the length of the engaging surface measured along a length from the juncture with main shaft 24 to the outer periphery of the disk, also increases. The larger that diameter and the larger that length, the larger the drive ratio that can be achieved. As the diameter becomes large, it may be difficult to physically fit the CVT into some spaces. The length of the inclined engaging surface on the rollers 32, 34; or the area of the engaging surface mating with the disks 26, 28, 30; must be sufficiently large so that the fluid film pressure between the mating surfaces does not cause the hardened surface of the rollers and disks to fatigue and fail at an unacceptable rate.

The angle of inclination is the angle of the driving or driven surface of rollers 32, 34 and of the mating surfaces on input disk 26, output disk 30, and the two mating surfaces on idler disk 28, relative to the axis of rotation of one of those parts. As shown in the figures, the rotating surfaces are slightly offset from the vertical axis, and the angle of inclination is given with respect to that vertical axis. The angle of inclination affects the drive efficiency and the drive ratio. The effect on the drive ratio can be determined from the drive ratio calculation shown above. But the angle of inclination also affects the slippage, torque transmission capability, and the wear on the contacting parts. The minimum angle of inclination is a function of the frictional coefficient between the contacting surfaces.

A steeper angle of inclination is better as it reduces the hydraulic pressure used to maintain engagement of the mating traction surfaces. An angle of inclination relative to the vertical of about 12 degrees is believed preferable for currently available metals, but the angle will vary with the application and materials selected. The 12 degree angle is a compromise between contact spin losses at the traction interface and the level of hydraulic pressure used to maintain engagement of the mating traction surfaces. The maximum angle inclination using present materials is believed to be about 30 degrees, with 10–14 degrees being the preferred range. The preferred angles are a compromise based on various factors, including contact spin losses and transmission efficiency which is affected by several factors. Moreover, as the angle becomes less than 10 degrees, the axial force parallel to the length of main shaft 24 begins to approach the friction normal force that is radial to main shaft 24 created by the contact between the rollers 32, 34 and disks 26, 28, 30. The friction normal force at the contact interface cannot exceed the radial force trying to drive the rollers 32, 34 outward. The hydraulic pistons 60 can only push, they cannot pull. Outward movement of the rollers 32, 34 can only be accomplished by the squeezing of the disks 26, 28, 30 and its wedge effect on the outward moving roller 32, 34. Larger angles of inclination reduce the axial force parallel to length of the main shaft 24 and that reduces the frictional engagement of the torque transmitting elements. Thus, inclination angles smaller than about 10 degrees, and even down to about 7 degrees, are believed possible, but not desirable.

The mating surfaces of rollers 32, 34, and disks 26, 28, 30 are preferably made of appropriate metals, such as case hardened steel. A suitable traction fluid is sprayed on the mating contacting surfaces. The traction fluid conducts shear forces under the high contact pressures existing at the fluid-film interface between the mating parts of the rollers 32, 34 and the disks 26, 28, 30. A suitable traction fluid is available from most major petrochemical companies. One such traction fluid is sold under the trademark SantoTrac and is made by Findett, located in St. Charles, Mo.

Figure 8:
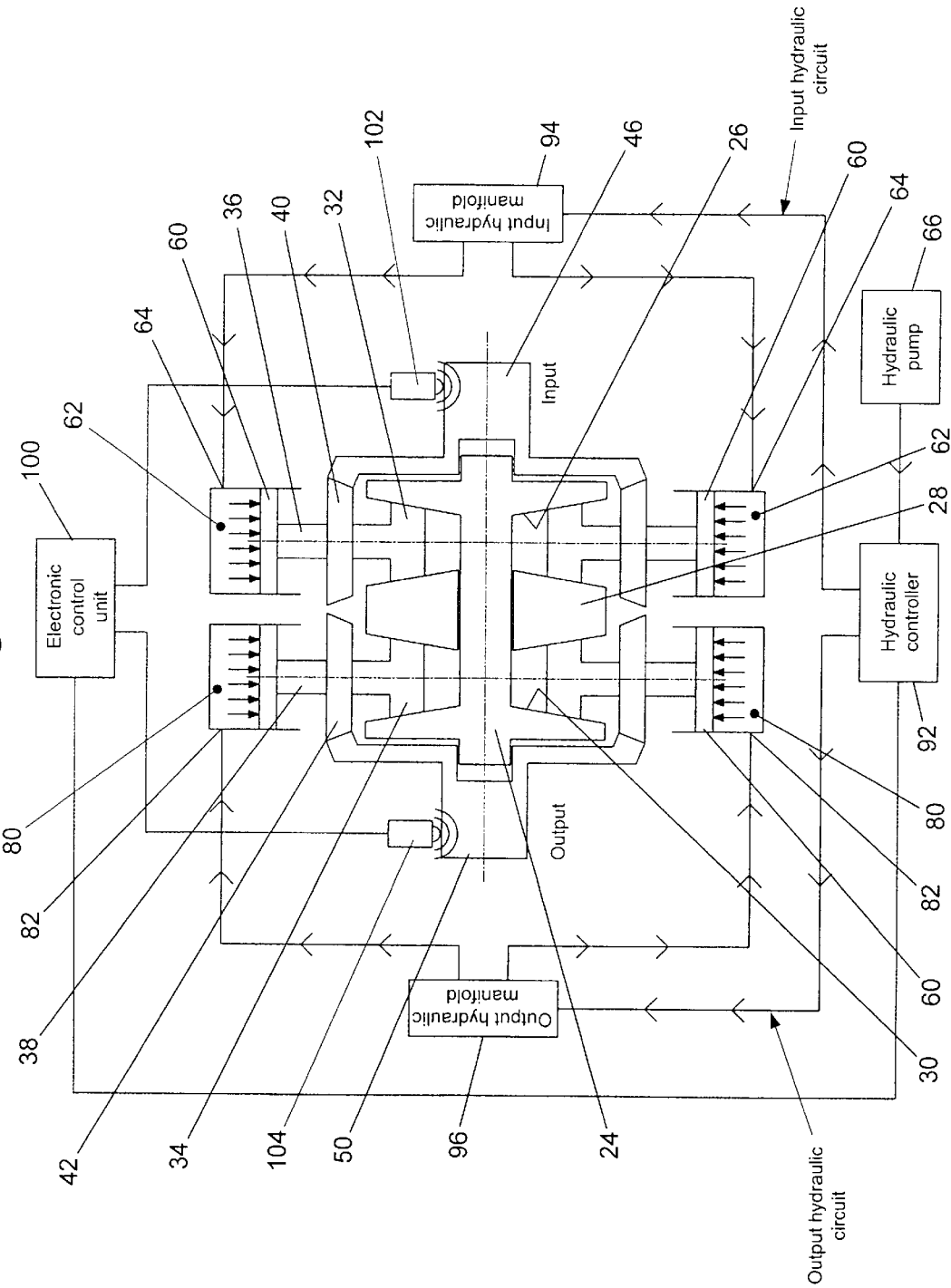
FIG. 8 is a schematic of a hydraulic control and actuation system for the CVT of FIG. 1.

Referring to FIG. 8, a schematic of the hydraulic control system is shown. A hydraulic pump 66 provides pressurized hydraulic fluid to hydraulic controller 92. The Hydraulic controller 92 is in fluid communication with an input hydraulic manifold 94 and an output hydraulic manifold 96. The input hydraulic manifold is in fluid communication with the inlet 64 for each hydraulic input cylinder 62. There is one input cylinder 62 for each driving roller 32 and each driving roller 32 has an associated piston 60 causing the piston and roller 32 to reciprocate along the radial axis of the associated input roller shaft 36 as the hydraulic pressure on the piston 60 is actuated. Similarly, the output hydraulic manifold is in fluid communication with the inlet 82 for each hydraulic output cylinder 80. There is one output cylinder 80 for each driven roller 34 and each driven roller 34 has an associated piston 60 causing the piston and roller 34 to reciprocate along the radial axis of the associated output roller shaft 38 as the hydraulic pressure on the piston 60 is actuated.

By using a common hydraulic controller the pressure can be simultaneously controlled to the input and output cylinders 62, 80, and the input and output rollers 32, 34 can simultaneously move radially inward or outward in order to vary the drive ratio. Any slight differences in timing are accommodated by the ability of the middle or idler disk 28 to translate along the length of the main shaft 24. There is thus provided means for simultaneously moving the input rollers 32 a controlled distance and means for simultaneously moving the output rollers 34 a controlled distance.

The hydraulic controller can be controlled in a variety of ways, one of which is depicted schematically in FIG. 8. An electronic control unit 100 receives input from input speed sensor 102 and output speed sensor 104. The sensors 102, 104 advantageously detect the speed of the input shaft 46, and output shaft 50, respectively. Optical sensors, photodetectors, tachometers, and a variety of devices can be used for sensors 102, 104. The signals are preferably, but optionally electronic signals fed to control unit 100. Control unit 100 is advantageously a computer or signal processing unit that receives not only the signals from inputs 102, 104 but (optionally) also receives information on the operational characteristics of the power source and the desired output. The electronic control unit processes the information and sends a control signal to the hydraulic controller 92 causing the controller 92 to vary the drive ratio to achieve the desired result. A variety of control algorithms can be used by the electronic control unit 100, and those controls will vary with the particular application needs, the power source, and the driven object.

The CVT design offers a number of advantages. The CVT design allows for coaxial input and output, because the input shaft 46 is coaxial with the output shaft 50. That offers numerous advantages in a variety of applications. Further, by using the idler or middle disk 28, the forces on the CVT moving parts are balanced, both axially and radially. This assumes that the rollers 32, 34 are symmetrically located. The use of symmetrically located rollers 32,34 and gears 40, 42 also lends to a balanced system. The balanced system results in symmetric force distribution that eliminates or greatly reduces vibration from unbalanced loads, and that also reduces bending and the stress failures and vibration that can result from unbalanced loads. The balanced forces also allow the use of smaller bearings as the bearing loads are smaller than in an unbalanced system. By allowing a wide drive ratio that is infinitely adjustable within that drive ratio, the power source can operate at maximum efficiency. That allows increased fuel economy. The hydraulic control system allows symmetric and simultaneous movement of the hydraulically actuated parts, and that also helps to balance the loading on the CVT. Further, in this design for the CVT 20, a low force is needed to move the pistons 60, and that allows a lower power hydraulic pump 66, which in turn results in greater efficiency of the CVT 20. There is thus provided a control system that uses less power for the hydraulic pump 66 than prior CVT's that used hydraulic controls.

By having the end disks 26, 30 fixed to a common main shaft 24 and by allowing the middle disk 28 to move laterally along the length of that main shaft 24, the loading on the CVT 20 is maintained more uniformly and the parts are easier to initially assemble and align. Because the input rollers 32 are driven by a common hydraulic system to move the same amount inward or outward relative to main shaft 24, they will exert a uniform force on the idler disk 28. The output rollers 34 are also controlled by a common hydraulic system so the output rollers 34 also move a controlled amount. If either the input rollers 32 or the output rollers 34 are slightly out of position, the rollers 32 or the rollers 34 will all be off by the same amount. Any error in position is accommodated by the ability of the middle or idler disk 28 to move laterally. Indeed, as the rollers 32 move inward toward main shaft 24, the idler disk 28 will move toward the output rollers 34 until the rollers 34 engage the idler disk 28. The laterally moving idler roller 34 thus provides a self-adjustment or self-compensating feature to the balance of forces being transmitted by the CVT 20.

The traction element that varies the rotations speed of the CVT 20 is commonly called a variator. The variator in the above described CVT includes rollers 32, 34 and disks 26, 28, 30 mounted to main shaft 24. The present CVT is unusual in that the variator includes middle or idler disk 28 that is free spinning about main shaft 24, and that translates along the length of main shaft 24, along the rotational axis of that shaft. Another unusual aspect of the CVT construction is the engagement of input rollers 32 on one side of idler disk 28 and the engagement of output rollers 34 on the opposing side of idler disk 28.

Figure 9:
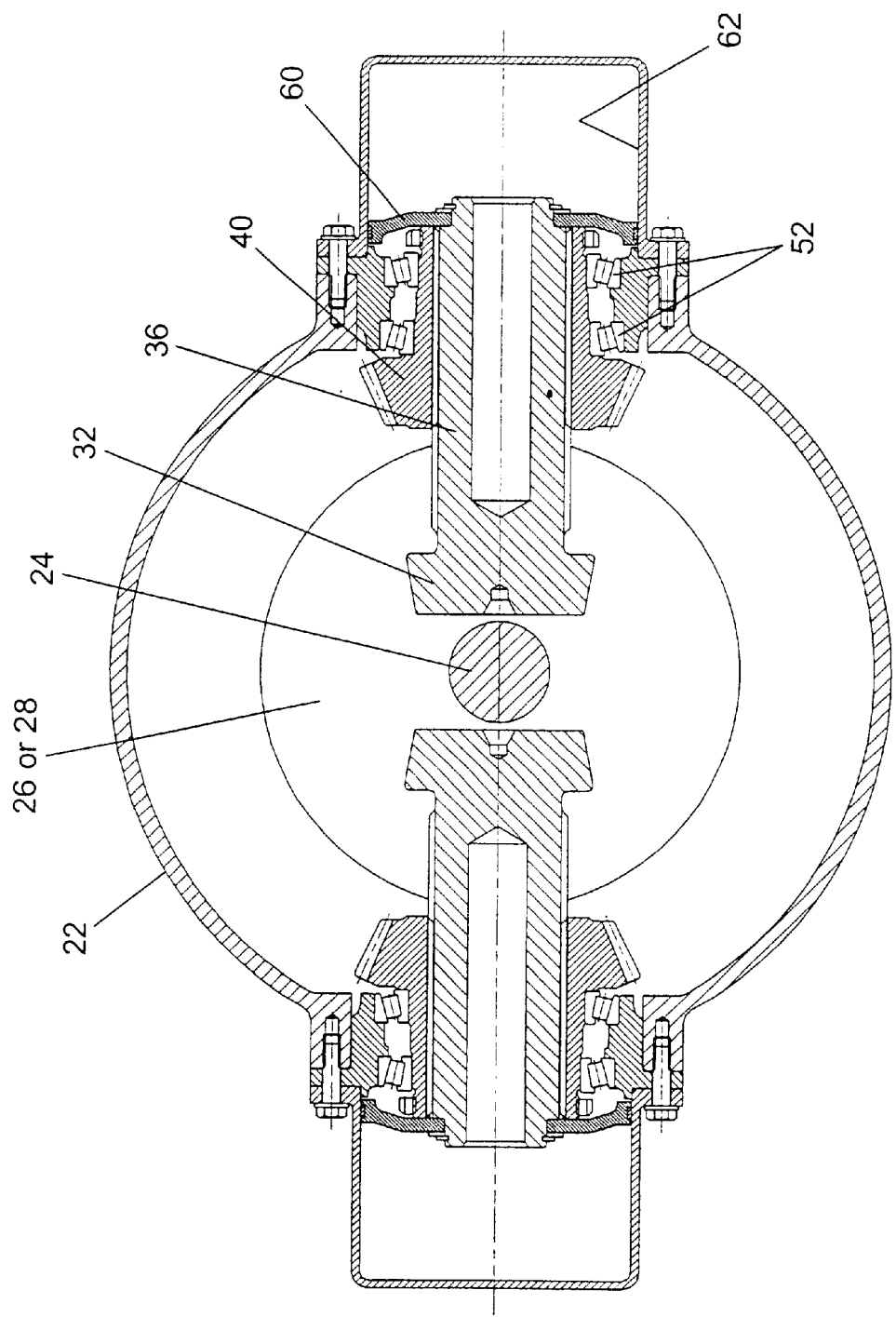
FIG. 9 is a cross-sectional view of the CVT of FIG. 1, but having two input and two output rollers.
Figure 10:
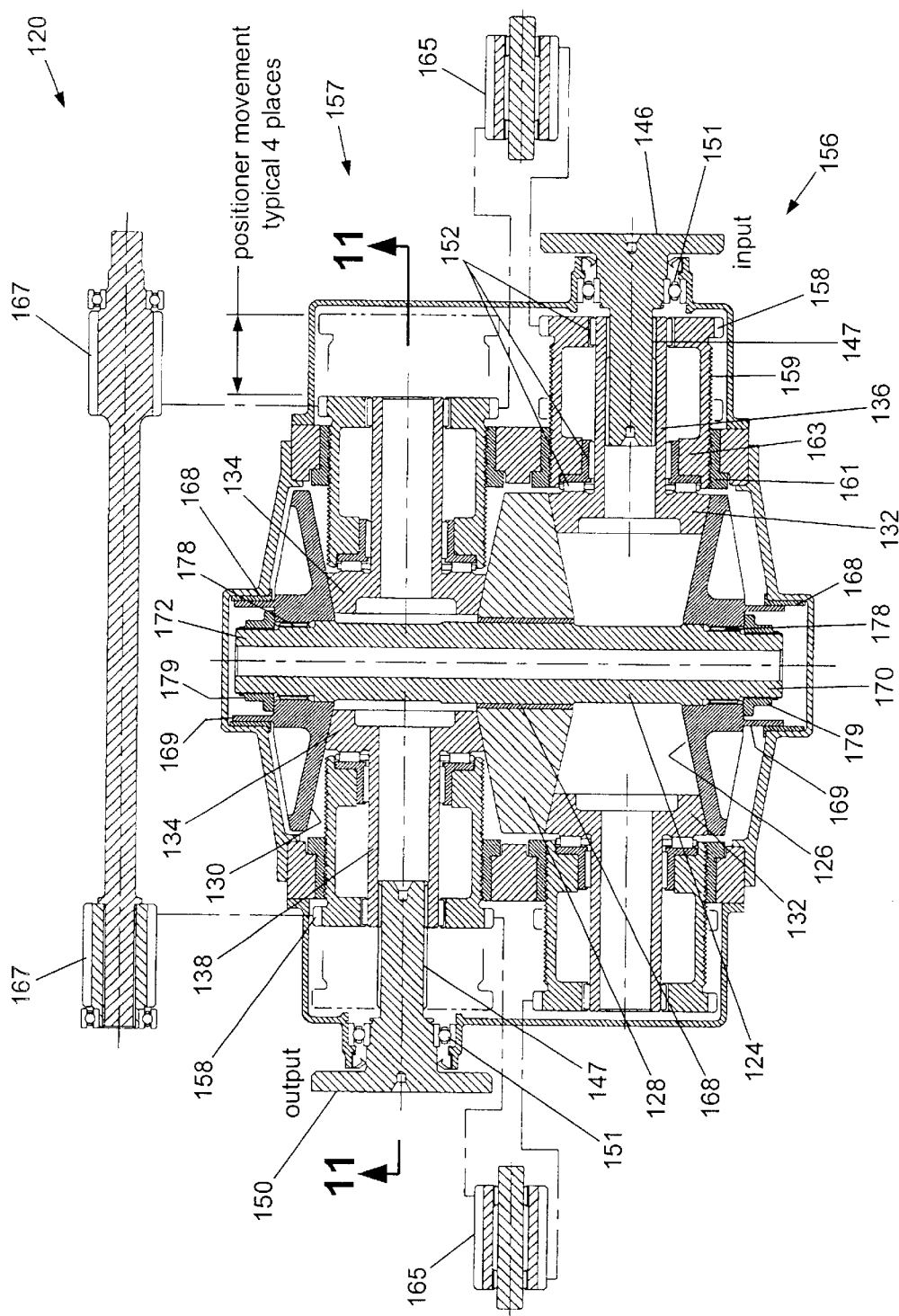
FIG. 10 is a sectional view of a further embodiment of the CVT of FIG. 1.
Figure 11:
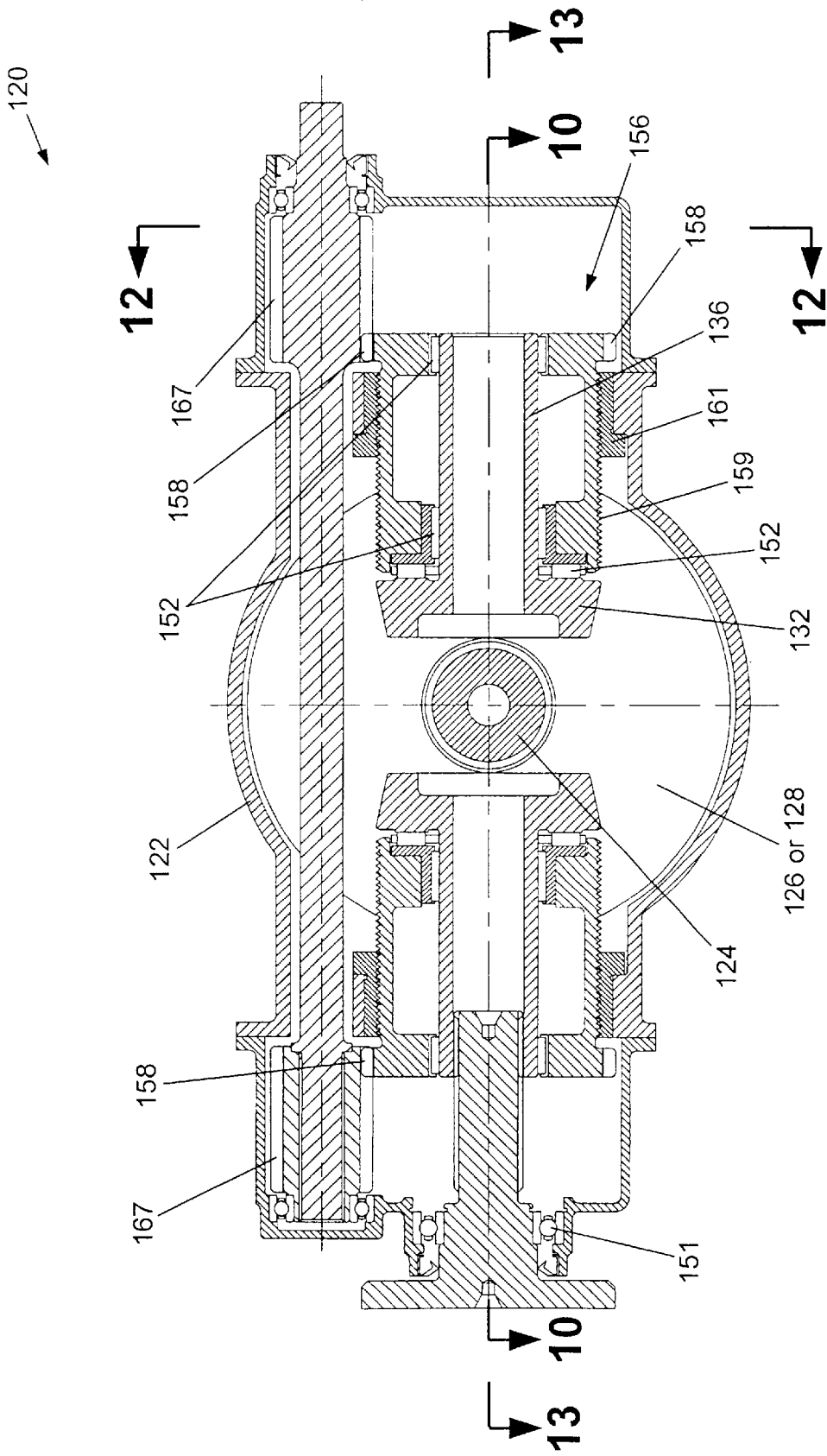
FIG. 11 is a vertical, cross-sectional view of the CVT of FIG. 10.
Figure 12:
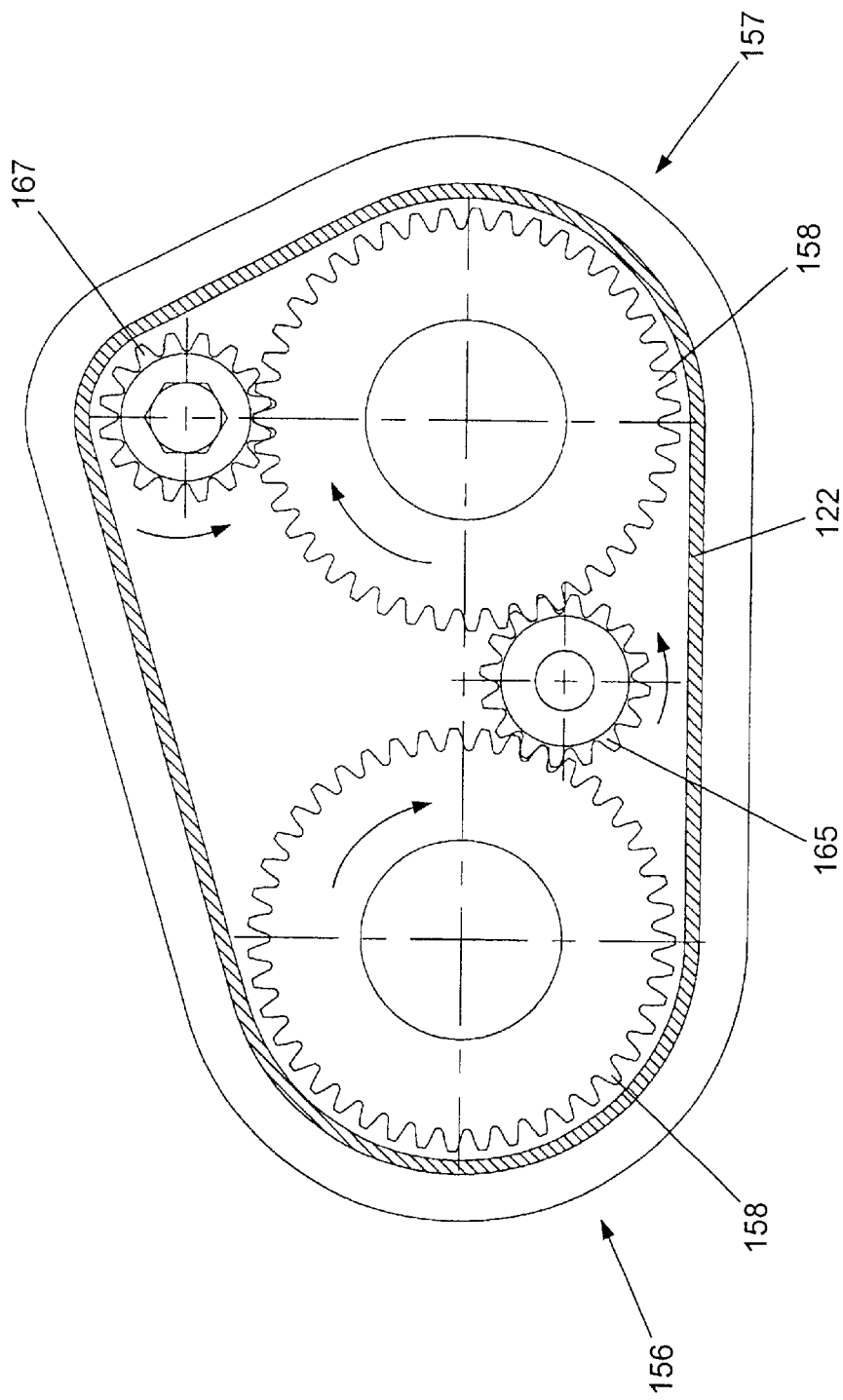
FIG. 12 is a sectional view along section 12—12 of FIG. 11.
Figure 13:
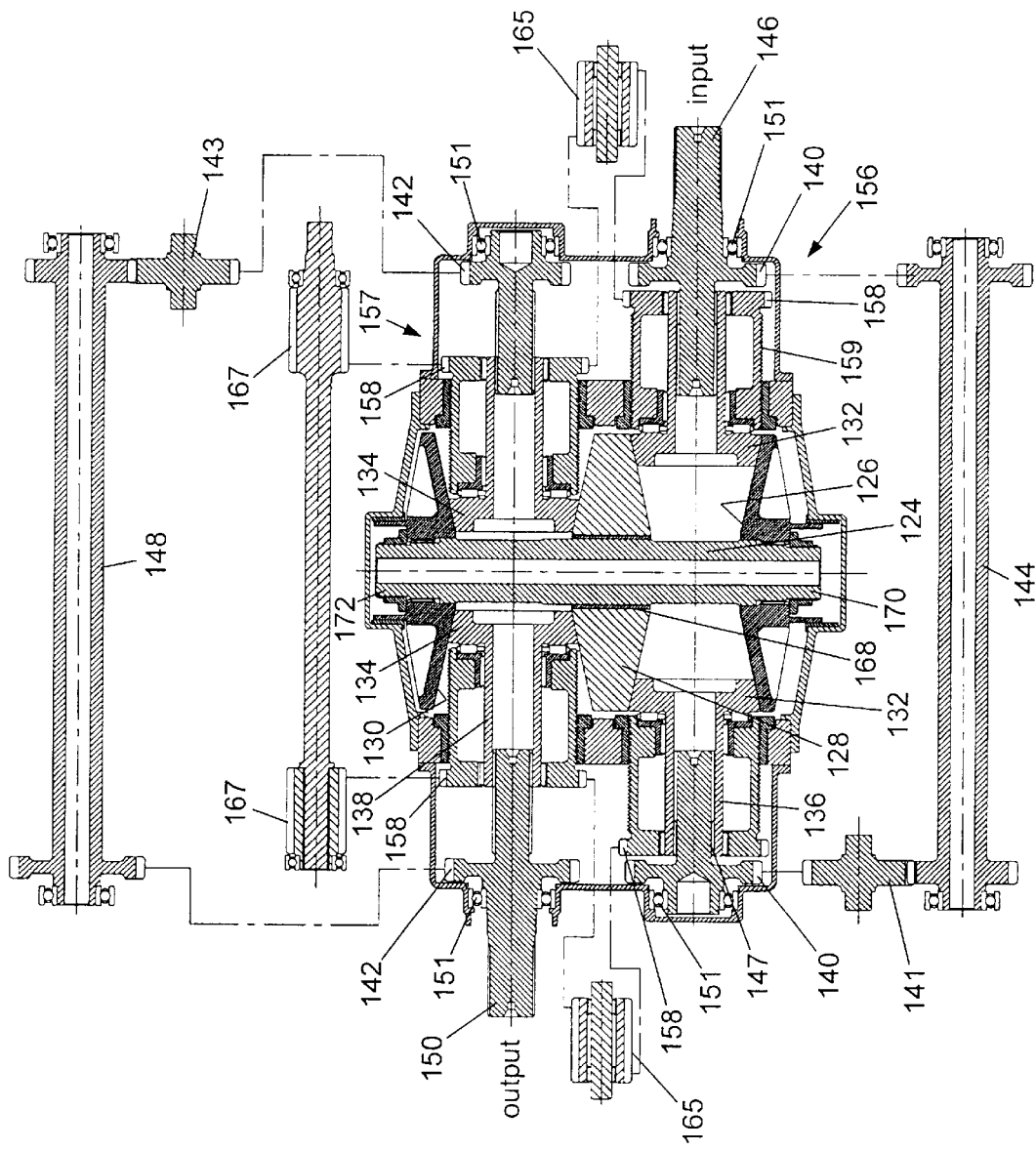
FIG. 13 is a horizontal, cross-sectional view of the CVT of FIG. 10, including gear shafts to distribute input and output torque equally between the input and output rollers.

FIG. 9 shows an embodiment of a CVT 20 having two input rollers 32 located on opposing sides of the main shaft 24 so the loads on the system are balanced. The output portion of the CVT 20 would preferably also have two output rollers 34 (not shown) so the system could be balanced. The parts function the same as previously described, and except for a different number of rollers 32 and accompanying parts, the operation does not fundamentally change. Thus, the arrangement will not be described again in detail. The number of driving and driven rollers 32, 34 will vary depending on the desired application. The more rollers 32, 34 that are used, the greater the power that can be handled by the CVT 20.

The above description uses a single set of input rollers 32 and a single set of output rollers 34 in a single CVT 20. The output 50 of the CVT 20 can be used as the input for a second CVT 20b in order to achieve further drive ratios.

A further embodiment of the CVT is shown in FIGS. 10–13, which uses a mechanical screw mechanism to position the rollers 32, 34. Many of the parts are identical to those in the prior embodiment, and a few are either used differently or slightly modified. For this further embodiment, similar parts will be given the same number but will be incremented by 100 and differences will be described. Not all part numbers shown in the drawings will be described or even referred to, and in such cases the parts are analogous to the corresponding parts described in the earlier embodiments.

The CVT 120 of this further embodiment is described with respect to two diametrically opposing input rollers 132 and two output rollers 134, but larger numbers of rollers could be used. Power from a power source such as a motor (not shown) is input through input shaft 146 which is in driving communication with at least one, and preferably only one, input roller 132 (e.g., only 132a or 132b). The input shaft 146 has a splined surface 147 that engages a mating splined surface on tubular input roller shaft 136 which has input roller 132 mounted at the distal end of input roller shaft 136. The splined engagement allows input roller shaft 136 and roller 132 to rotate while still allowing the shaft 136 and roller 132 to move relative to the input shaft 146. The power input shaft 146 is constrained by bearing 151. The splined engagement thus fixes the shafts 136 and 146 radially, but allows the shaft 136 and roller 132 to move axially along the length of the shaft 146.

The input roller 132 (132a, 132b) is positioned by the input roller positioner 156 that includes a gear, bearings, threaded portion, and end portion as described hereinafter. The input roller positioner 156 has a spur gear 158 mounted to an end of the input roller shaft 136 opposite the roller 132. The gear 158 is mounted by bearings 152 to rotate about the roller shaft 136 and is coaxial with roller shaft 136. The gear 158 forms the top of a cup-shaped enclosure which has external threads 159 and an opposing end 163 on the cup that is also rotatably mounted to rotate around input roller shaft 136 by bearings 152. Bearings 152 are also interposed between the end 163 and the roller 132 so the gear 158 and threads 159 can freely rotate about roller shaft 136. The threads (left handed or right handed) are selected to achieve the desired movement, keeping in mind the direction in which various parts are rotating. Thus, for example, if positioner threads 159a are right handed then positioner threads 159b are left handed, and positioner threads 159c are left handed and positioner threads 159d are right handed. But the threads 159 mate with an insert 161 on the housing 122 that is also threaded, and that is stationary. Thus, rotation of gear 158 and threads 159 causes the threads and gear to translate along the length of input roller shaft 136, and that causes the input roller 132 to translate toward and away from the shaft 124.

The output roller 134 has a similarly constructed output roller positioner 157 that includes a gear, exterior threads, and an end portion supported by bearings about output roller shaft 138. Thus, gear 158, exterior threads 159, and end portion 163 are supported by bearings 152 around output roller shaft 138 analogously to the description of roller 132. Similarly, threaded insert 161 is mounted in the housing 122 and located so that the threaded portion mates with threads 159 surrounding output roller 134. However, on the output portion, threads 159 and 161 are reversed to form an opposite handed thread so that rotation in the same direction as associated with the input roller 132 moves the output roller 134 in an opposite direction relative to shaft 124. Thus, rotation of gear 158 and threads 159 surrounding the output roller 132 causes the threads and gear to translate along the length of output roller shaft 138, and that causes the output roller 134 to translate toward and away from the shaft 124. An idler gear 165 is interposed between the gears 158 surrounding the input roller shaft 136 and output roller shaft 138, so that the idler gear 165 is interposed between the input roller positioner 156 and output roller positioner 157. Because of the reversed thread on the output roller positioner, the gears 158 on roller shafts 136, 138 rotate in opposite directions. That opposite rotation causes the input roller 132 to move opposite the output roller 134 by an equal amount. The illustration shows plain screw threads, but to increase efficiency, a ball screw type of threaded connection can be used. The positioners 156, 157 thus provide means for mechanically, simultaneously moving the rollers 132, 134 an equal radial distance relative to shaft 124, but in opposite directions.

A suitable gear train is used to synchronize the input and output gears 140, 142. Still referring to FIGS. 10–13, the rollers 132, 134 are mechanically controlled to move in the desired directions at the same rates of travel. Various gear and/or pulley systems can achieve this synchronization. The figures show synchronization gears 167 located on opposing ends of a shaft with the geared surfaces having elongated gear teeth, such as a spline. The splined gears 167 are located so they mesh with the gears 158 on the output positioner 157. Preferably, but optionally, the spline in the gear shaft 167 is a "vernier" device to allow accurate synchronization of the two output positioner gears 158 at the time of assembly. By mechanically coupling the rotation of gears 158 on all positioners 156, 157, mechanical synchronization and rate of motion can be achieved for the input and output rollers 132, 134. There is thus advantageously provided a means for mechanically synchronizing movement of rollers 132, 134.

Advantageously, in this embodiment there is an input shaft 146 associated with each input roller 132 and roller input shaft 136, and there is an output shaft 150 associated with each output roller 134 and output roller shaft 138. It may be impractical to use ring gears to engage and synchronize the geared surfaces 140, 142 on the input and output shafts 146, 150. An alternative mechanism to synchronize rotation and to engage power input and output gears at appropriate locations is shown in FIGS. 10–13. A geared shaft 144 is provided having gears on opposing ends of a shaft, with the gears located to engage the gears 140 on power input shaft 146. An idler gear 141 can be interposed between the geared shaft 144 and gears 140 as needed in order to account for different rotational directions on the input gears 140. Similarly, a geared output shaft 148 is provided having gears on opposing ends of a shaft with the gears located to engage the power output gears 142. An idler gear 143 can be interposed between the geared shaft 148 and power output gears 142 as needed in order to account for different rotational directions on the power output gears 142. There is thus provided mechanical means for inputting power to, and removing power from, the CVT 20.

To transmit torque from input rollers 132 to output rollers 134, the conical portion of the rollers 132, 134 bears against disks 126, 128, 130, which together form a variator. The outer disks 126, 130 are fixed together by shaft 124. The disks 126, 130 are fixed radially to the shaft 124 by splines 178 which would allow axial motion along shaft 124 but restrain rotation about that shaft. Threaded fasteners 179 hold the disks 126, 130 in position along the axial length of the shaft 124. The idler disk 128 is supported by a bushing 168 so it can freely rotate about, and translate along, shaft 124.

The power output path is the reverse process from the input. Torque is transferred from variator disk 130 and idler disk 128 to the output roller 134. The output roller 134 is fixed to output shaft 150 by a splined surface 147 on the output shaft that mates with a splined surface on output roller shaft 138, which is preferably hollow to receive the shaft 147 inside the output roller shaft 138. As the roller shaft 138 rotates with output roller 134, the output shaft 150 will also rotate and output power from the CVT 120.

This alternative embodiment has both disks 126, 130 mounted on splines. Further, end disks 126, 130 are configured to have an annular surface 169 that mates with a recess in the housing 122, with a bushing 168 interposed between the annular surface and the recess in order to allow low friction rotation and some axial movement of the shaft 124. Further, the rollers 132, 134 and their roller shafts 136, 138 are shown as having a central, cylindrical aperture to provide lighter weight components and to allow mating of input and output shafts 146, 150 with the roller shafts 136, 138.

There is thus advantageously provided means for changing the locations of the input rollers 32, 132 and output rollers 34, 134 relative to the rotational axis 24, 124 about which disks 26, 28, 30, 126, 128, 130 rotate in order to change the gear ratio of CVT 20, 120. Drive ratio's of 6.5:1 commonly used for motor vehicles are believed readily achievable, and greater drive ratio's possible with this construction.

The rollers 32, 34, 132, 134 have conical surfaces, preferably comprising truncated conical surfaces. There is some advantage to providing a slight bulge or crown to these surfaces, a bulge on the order of a few hundred-thousandths of an inch to very few thousandths of an inch over the conical surface. A bulge of about 0.001 inches is believed sufficient. This slight bulge allows for misalignments and tolerance variations in the mating surfaces of rollers 32, 34, 132, 134 with the disks 26, 28, 30, 126, 128, 130.

A significant advantage of the CVT 20, 120 is that the forces on the main shaft 24, 124 are balanced, and thus mounting of that rotating shaft is greatly simplified. Similarly, the input and output roller gears 32, 34, 132, 134 provide opposing forces on disks 26, 28, 30, 126, 128, 130 to balance the forces on the assembly. The use of hydraulic forces to move the input and output roller gears allows uniform movement and helps symmetrically move and balance the system. The use of the mechanical assembly to move the input and output roller gears ensures simultaneous movement by mechanical means.

There is also provided a traction-type CVT that uses a mechanical or a hydraulic system for controlling speed changes. The CVT has many applications, such as in vehicle transmissions or industrial drives. The drive ratio in the system, input to output, is infinitely variable throughout its range. The overall ratio is only limited by the relative diameters of the traction drive components. The transmission will provide its optimum efficiency when used with a traction type of lubricant.

The above description is given by way of example and not limitation. Given the above disclosure, one skilled in the art could devise variations that are within the scope and spirit of the invention, including various ways of mechanically controlling the motion of the rollers 32, 34, 132, 134. Moreover, while the above description defines certain bevel gears, spur gears, and ring gears, one skilled in the art would recognize that alternative gearing could be used to achieve the same result as disclosed herein. Similarly, various bushings, bearings, and other low-friction assemblies can be used to allow free-rotation and movement of the parts as described herein. Further, the various features of this invention can be used alone or in varying combinations with each other and are not intended to be limited to the specific combination described herein. Thus, the invention is not to be limited by the illustrated embodiments but is to be defined by the following claims when read in the broadest reasonable manner to preserve the validity of the claims.

What is claimed is:

1. A continuously variable transmission producing a variable drive ratio between an input and an output, comprising:

a main shaft rotating about a longitudinal axis and having an input disk and an output disk fixed to the shaft with each disk having a driving surface inclined at a substantially same angle with respect to a plane orthogonal to the rotational axis and which faces the driving surface on the other disk; an idler disk having a central hole through which the shaft extends, the idler disk being interposed between the two end disks, the idler disk not being connected so as to rotate with the shaft, and the hole and shaft being sized to allow the disk to translate along a portion of an axial length of the shaft, the idler disk having two opposed driving surfaces inclined toward each other at substantially the same angle as the driving surfaces on the end disks; and a plurality of input rollers having conical driving surfaces each rotating about an input roller axis that extends radially outward from the rotational axis of the shaft in a first plane orthogonal to the rotational axis of the shaft, the conical driving surfaces drivingly engaging driving surfaces on the input disk and on the idler disk, the disks and rollers arranged so that moving the rollers along the input roller axes varies the drive ratio.

2. The continuously variable transmission of claim 1, further comprising a plurality of output rollers having conical driving surfaces each rotating about an output roller axis that extends radially outward from the rotational axis of the shaft in a second plane orthogonal to the rotational axis of the shaft, the conical driving surfaces drivingly engaging driving surfaces on the output disk and on the idler disk, the disks and rollers arranged so that moving the output rollers along the output roller axes varies the drive ratio.

3. The continuously variable transmission of claim 2, wherein the input rollers and output rollers are symmetrically arranged about the main shaft rotational axis.

4. The continuously variable transmission of claim 3, wherein there are three input rollers and three output rollers.

5. The continuously variable transmission of claim 3, wherein each output roller is mounted to an output shaft extending along the output roller axis and having an output gear thereon that rotates with the output roller, and further comprising an output shaft coaxial with the main shaft and connected to an output ring gear engaging the output gears.

6. The continuously variable transmission of claim 3, wherein each input roller is mounted to an input shaft extending along the input roller axis and having an input gear thereon that rotates with the input roller, and further comprising an input shaft coaxial with the main shaft and connected to an input ring gear engaging the input gears.

7. The continuously variable transmission of claim 5, wherein each input roller is mounted to an input shaft extending along the input roller axis and having an input gear thereon that rotates with the input roller, and further comprising an input shaft coaxial with the main shaft and connected to an input ring gear engaging the input gears.

8. The continuously variable transmission of claim 5, further comprising a hydraulic piston connected to each output shaft to move the output shaft along the output roller axis.

9. The continuously variable transmission of claim 6, further comprising a hydraulic piston connected to each input shaft to move the input shaft along the input roller axis.

10. The continuously variable transmission of claim 7, further comprising a hydraulic piston connected to each input shaft and each output shaft to move the input shafts along the input roller axis and to move the output shafts along the output roller axis.

11. The continuously variable transmission of claim 1, wherein the angle of inclination is between about 10–14 degrees.

12. The continuously variable transmission of claim 1, wherein the angle of inclination is between about 7–30 degrees.

13. The continuously variable transmission of claim 1, wherein the main shaft has distal ends each held in recesses adapted to allow the main shaft to rotate about and translate along the rotational axis of the main shaft.

14. A continuously variable transmission producing a variable drive ratio between an input and an output, comprising:

a main shaft rotating about a longitudinal axis of the main shaft and having an input disk and an output disk fixedly mounted thereon to rotate and translate with the main shaft, the main shaft having an idler disk interposed between the input and output disks, the idler disk rotating about the main shaft and translating along the longitudinal axis of a portion of the main shaft, the input and output disks each having an annular driving surface inclined at an angle with respect to the vertical that is less than about 18 degrees, the idler disk having two annular and opposing surfaces each forming an inclined driving surface and each facing a driving surface on one of the input and output disks, the main shaft having opposing, first and second distal ends; a first recess receiving the first distal end of the main shaft and allowing the first distal end to freely rotate and to translate within the first recess; and a second recess receiving the second distal end of the main shaft and allowing the second distal end to freely rotate and to translate within the second recess; a plurality of conical input rollers having rotational axes that are symmetrically arranged around the main shaft in a first plane orthogonal to that shaft and engaging the driving surface of the input disk and one driving surface of the idler disk; and a plurality of conical output rollers having rotational axes that are symmetrically arranged around the main shaft in a second plane orthogonal to that shaft and engaging the driving surface of the output disk and one driving surface of the idler disk.

15. The continuously variable transmission as defined in claim 14, wherein movement of the rollers along the axis of rotation of the rollers varies the drive ratio.

16. The continuously variable transmission as defined in claim 15, further comprising hydraulic means for moving the rollers along the axes about which the rollers rotate.

17. The continuously variable transmission as defined in claim 15, further comprising mechanical means for moving the rollers along the axes about which the rollers rotate.

* * * * *